Dec. 1, 1931.  L. BONSIEUR  1,834,763
METHOD OF MOLDING AND APPARATUS THEREFOR
Filed April 16, 1927
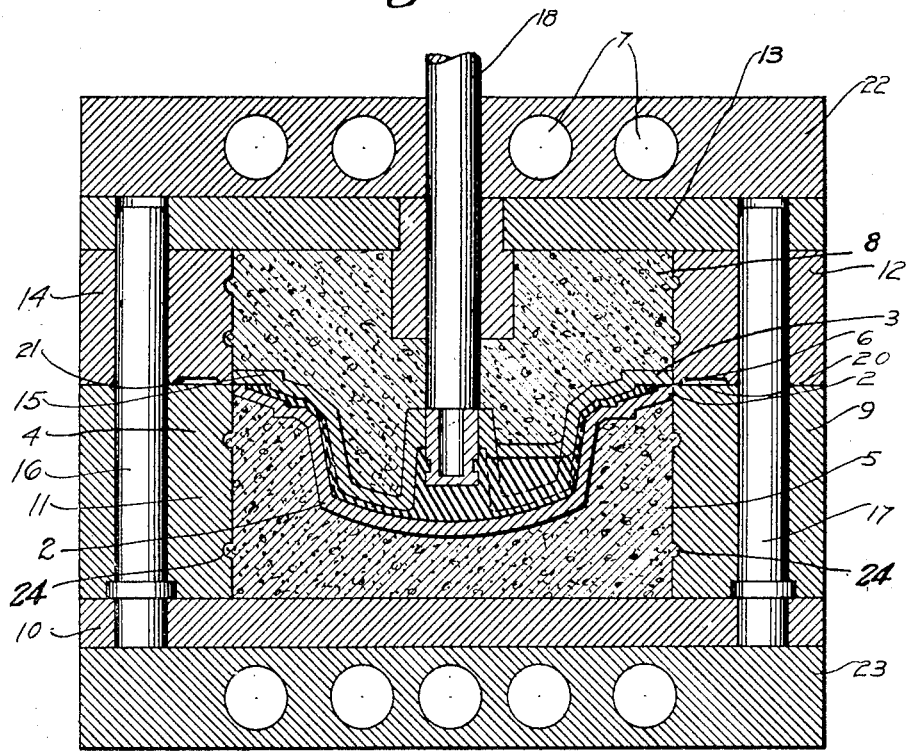
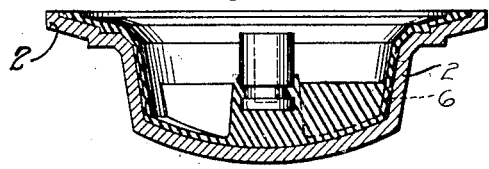
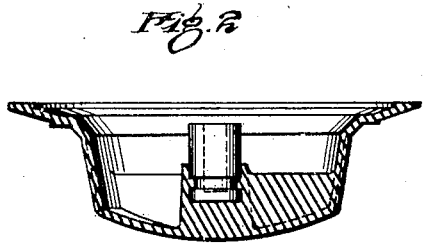
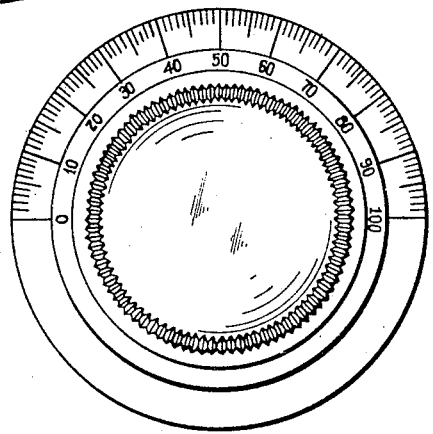
INVENTOR
L. E. Bonsieur
BY Frank M. Slough
ATTORNEY Patented Dec. 1, 1931

1,834,763

UNITED STATES PATENT OFFICE

LE BONSIEUR, OF ELYRIA, OHIO, ASSIGNOR TO THE GENERAL INDUSTRIES CO., OF ELYRIA, OHIO, A CORPORATION OF OHIO

METHOD OF MOLDING AND APPARATUS THEREFOR

Application filed April 16, 1927. Serial No. 184,207.

My invention relates to improvements in methods for making forming dies, and forming dies, as articles of manufacture, which are adapted for subsequent use in molding articles from plastic compositions.

An object of my invention is to inexpensively provide a die capable of being employed in a mold adapted for the forming of articles from plastic materials, such as phenolic condensation products, or like materials adapted to be molded under the influence of heat and pressure.

Another object of my invention is to inexpensively provide a die that will not deteriorate under high heat or high pressure.

Another object of my invention is to accomplish the making of a die, by workmen of ordinary skill, which will be durable in construction and economical to manufacture.

Another object of my invention is to accomplish the making of a die, by workmen of ordinary skill, which will be an accurate replica of the pattern.

Another object of my invention is to inexpensively provide a die for the making of variously formed articles, the die having a metallic face so backed by a heat conducting material as to be capable of withstanding high pressure and high heat, and communicating, efficiently the heat to molding material.

The above and other objects of my invention will become apparent from reference to the following description of an embodiment method thereof, in which description reference will be had to the accompanying drawings employed to explain the method, and forming a part of this specification.

Referring to the drawings:

Fig. 1 is a top plan view of a pattern capable of being reproduced by the method of my invention;

Fig. 2 is a transverse sectional view of the pattern of Fig. 1;

Fig. 3 is a transverse sectional view of the pattern of Fig. 1, with an electrolytically deposited layer of metal disposed upon one surface thereof; and Fig. 4 is a transverse sectional view of dies resulting from the use of my improved process in their respective relative positions during the heating and pressing operations of the subsequent process of molding articles by use of the dies.

Referring now to all the figures of the drawings, in which like reference characters are employed to designate like parts; in Fig. 1, I show a master pattern constructed of a non-electro-conductive material, such as wood or wax, of which molded replicas are desired to be made of phenolic condensation products or like plastic materials, and for the making of which, it is desired to construct a die.

In carrying out the process, a thin even coating of an electro-conductive finely comminuted powdered material, such as plumbago or aluminum paint, is applied to the surface to be plated, by first applying a thin coat of bees wax, buffing the same, and then applying the comminuted material, the surplus powdered material being removed preferably with a fine camel's hair brush.

The pattern 1, is then immersed in the electro-plating bath and a layer of copper, nickel, steel or other suitable metal material 2, is deposited upon the outer surface of the pattern at 6; the pattern being allowed to remain in the bath until a plate of the desired metallic material of preferably a thickness of 1/8", is deposited upon the plumbago treated surface of the pattern.

The pattern with the plating adhering to its surface is removed from the bath, and the plate 2 is then removed from the pattern in any suitable way, such as by subjecting it to heat, the difference in the coefficient of expansion of the metal and the non-metallic pattern effecting a stripping of the plate coating from the pattern. Sometimes, I employ a wax pattern and in such cases heat of a relatively low temperature may be applied to the pattern and plating whereby the wax is melted away from the plating.

The surface of the metallic plate, which has thus been removed from contact with the face of the pattern, forms a metallic die face, may be placed in position at the top of a mold box, as shown in Fig. 4.

The intermediate space 5 is filled with a mixture of litharge, glycerine, and brass filings, preferably in the proportion of four parts by weight litharge to one part glycerine. This mixture furnishes a suitable base for the die, the brass filings increasing the efficiency of heat conduction from the steam heating coils 7, of the die press carried by a pair of press jaws 22 and 23 as shown in the drawings in fragmentary view only. The annular grooves 24, become filled with the litharge mixture which is retained within the side walls of the mold element 4.

An upper die plate 3 is provided conforming to the shape of the under side of the pattern by likewise coating it with plumbago, aluminum paint or the like, electro-depositing a metallic plate of the desired thickness thereon, as in the case of the plate 2 formed on the outer surface of the pattern as previously described.

The die face element 3, is likewise backed by a mixture of litharge, brass filings and glycerine or like heat conducting relatively hard, non-compressible material placed in the mold element, such backing being shown at 8. The dies 2 and 3 are enclosed, as shown, by providing metallic flask walls 9, 10 and 11 for the concave die 12, 13 and 14 for the convex die 3, having the face 15. Guide pins 16 and 17, and an ejecting pin 18, are provided for aligning the flask sections and for ejecting the molded article in a manner commonly employed in the use of such pins for molds of this character.

In molding articles, such as the radio dial illustrated, between dies formed as above described, the concavely faced die is placed on the platen 23, which is heated by steam coils 7; and the molding material consisting of powdered phenolic condensation material or like material, preferably in the form of a "pill" having the requisite amount of material in it, is placed within the cavity formed by the two dies. The upper die element, having a convex die face, is then superposed into the lower element, being guided to position therein by guiding pins 16 and 17.

Heat and pressure is then applied by the heated press elements 22 and 23, which are pressed towards each other, compressing and heat treating the powdered material above referred to in the mold which is thus caused to assume the plastic state, and flows to all parts of the recess between the die faces 6 and 15, which recess conforms to the contour of a radio dial or other article to be molded. The surplus molding material escapes through to recesses 20 and 21, provided for that purpose, during the period while the side plates 12, approach opposing side plates, as 9 and 10 of the lower die element. The upper and lower die plates are brought together and the heating and pressing is effected for the proper period of time determined by experience.

Upon completion of the molding operation, cold water may be circulated through the heating pipes 7, to assist in cooling the mold and the article contained therein.

Having thus described my invention in a specific embodiment and in a process employing certain steps, I am aware that numerous and extensive departures may be made from the embodiment herein illustrated and described and by varying the number of the process steps, but without essentially changing the character of the process steps and without departing from the spirit of my invention.

I claim;

1. A method of forming a mold die for molding articles having a convexly formed surface, which includes applying a thin smooth coating of wax material to such surface, then applying finely comminuted metallic powder to the waxed surface, electroplating a metallic facing of substantial thickness upon the powder, separating the facing from the article backing the facing with a hard setting plastic material of great heat and pressure resistivity and rendered of high heat conductivity by having mixed therewith particles of metal having high heat conductivity, the exposed surface of the facing being that surface thereof which was removed from intimate contact with the article surface.

2. A method of forming a mold die for molding articles having a convexly formed surface, which includes appplying a thin smooth coating of wax material to such surface, applying finely comminuted metallic powder to the waxed surface, electro-plating a metallic facing of substantial thickness upon the powder, separating the facing from the article, backing the facing with a plastic composition comprising a mixture of litharge and glycerin to render it hard setting and of high pressure and heat resistivity and containing particles of highly heat conductive metal to render it of high heat conductivity, the exposed surface of the facing being that surface thereof which was removed from intimate contact with the article surface.

3. A method of forming a mold die for molding articles having a concavely formed surface, which includes applying a thin smooth coating of wax material to such surface, applying finely comminuted metallic powder to the waxed surface, electro-plating a metallic facing of substantial thickness upon the powder, separating the facing from the article, backing the facing with a plastic composition comprising litharge and glycerin approximately in the proportions of four parts by weight of litharge to one part of glycerin to render it hard setting and of high pressure and heat resistivity and comprising also particles of metal having high heat conductivity to render the set mixture of high heat conductivity, the exposed surface of the facing being that surface thereof which was removed from intimate contact with the article surface.

4. In a molding device for molding articles from plastic material under relatively great heat and pressure, a facing having the configuration of the article to be molded, a molding flask for supporting the same and a backing for the facing for holding it in position in the flask and for transmitting heat and pressure to the facing, said backing being composed of litharge, glycerin and metal filings, whereby it is rendered hard setting and of high pressure resistivity and high heat conductivity.

5. In a molding device for molding articles from plastic material requiring relatively great pressure and high temperature, a flask, a heat conducting pressure applying cover for the flask, means for applying heat and pressure to the cover, a molding facing positioned in the flask and a backing filling the space enclosed by the facing, the flask and the cover, said backing being a composition of material comprising litharge and glycerin in proportion to render the composition plastic enough to fill the interstices in said enclosed space and to render it hard setting and mechanically strong to resist the required said molding pressure and comprising metal filings in sufficient amount to transmit to the facing the required said heat.

In testimony whereof I hereunto affix my signature this 24th day of February, 1927.

LE BONSIEUR.